US012120347B2

(12) United States Patent
Schwarz et al.

(10) Patent No.: US 12,120,347 B2
(45) Date of Patent: Oct. 15, 2024

(54) METHOD, AN APPARATUS AND A COMPUTER PROGRAM PRODUCT FOR VIDEO ENCODING AND VIDEO DECODING

(71) Applicant: Nokia Technologies Oy, Espoo (FI)

(72) Inventors: Sebastian Schwarz, Unterhaching (DE); Ioan Tabus, Tampere (FI); Emre Can Kaya, Tampere (FI)

(73) Assignee: Nokia Technologies Oy, Espoo (FI)

( * ) Notice: Subject to any disclaimer, the term of this patent is extended or adjusted under 35 U.S.C. 154(b) by 245 days.

(21) Appl. No.: 17/906,991

(22) PCT Filed: Mar. 15, 2021

(86) PCT No.: PCT/FI2021/050183
§ 371 (c)(1),
(2) Date: Sep. 22, 2022

(87) PCT Pub. No.: WO2021/191499
PCT Pub. Date: Sep. 30, 2021

(65) Prior Publication Data
US 2023/0119830 A1 Apr. 20, 2023

(30) Foreign Application Priority Data
Mar. 26, 2020 (FI) ..................................... 20205300

(51) Int. Cl.
*H04N 19/597* (2014.01)
*H04N 19/14* (2014.01)
(52) U.S. Cl.
CPC ........... *H04N 19/597* (2014.11); *H04N 19/14* (2014.11)

(58) Field of Classification Search
CPC .............................. H04N 19/597; H04N 19/14
See application file for complete search history.

(56) References Cited

U.S. PATENT DOCUMENTS 10,839,267 B2 * 11/2020 Mehr ........................ G06N 3/04
2011/0292998 A1 * 12/2011 Ohgose .................. H04N 19/11
375/E7.243

(Continued)

OTHER PUBLICATIONS

"G-PCC codec description v5", 3DG, ISO/IEC JTC1/SC29/WG11 N18891, Oct. 2019, 73 pages.

(Continued)

*Primary Examiner* — Shawn S An
(74) *Attorney, Agent, or Firm* — Nokia Technologies Oy (57) ABSTRACT

Encoding a two depth images of points of a bounded volume (730); determining a first section across a second axis between the depth images to generate a feasible occupancy image and a list of pixels with unknown occupancy status (740); encoding a binary sequence according to a true occupancy image, wherein the binary sequence transmits the occupancy status for the list of pixels with unknown occupancy status (750); detecting anchoring points from the binary sequence, and encoding missing elements between the anchoring points (760); determining a first section across a third axis from the bounding volume reconstructed so far and create a list of pixels with unknown status (780); encoding a binary sequence according to the true occupancy image the sequence conveying the occupancy status of the list of pixels with unknown status (785); and detecting the anchor points from the sequence and corresponding list of pixels and encoding missing elements between the anchoring points (795).

14 Claims, 8 Drawing Sheets

(56) References Cited

U.S. PATENT DOCUMENTS

| | | |
|---|---|---|
| 2012/0307010 A1 | 12/2012 | Evertt et al. |
| 2016/0086353 A1* | 3/2016 | Lukac et al. |
| 2017/0270711 A1* | 9/2017 | Schoenberg .......... A63F 13/213 |
| 2019/0088004 A1* | 3/2019 | Lucas .................... G06T 19/20 |
| 2022/0398784 A1* | 12/2022 | Taquet .................... G06T 9/40 |
| 2023/0071581 A1* | 3/2023 | Lasserre ................ H03M 7/70 |

OTHER PUBLICATIONS

Tabus et al., "Context coding of depth map images under the piecewise-constant image model representation", IEEE Transactions on Image Processing, vol. 22, No. 11, Nov. 2013, pp. 4195-4210.

Mammou et al., "G-PCC codec description v2", 3DG, ISO/IEC JTC1/SC29/WG11, N18189, Jan. 2019, 39 pages.

"Region Adaptive Hierarchical Transform (RAHT)", Github, Retrieved on Sep. 30, 2022, Webpage available at : https://github.com/digitalivp/RAHT.

Office action received for corresponding Finnish Patent Application No. 20205300, dated Dec. 7, 2020, 9 pages.

Gabeur et al., "Moulding Humans: Non-Parametric 3D Human Shape Estimation From Single Images", IEEE/CVF International Conference on Computer Vision (ICCV), Oct. 27-Nov. 2, 2019, pp. 2232-2241.

"V-PCC Codec Description", 3DG, ISO/IEC JTC1/SC29/WG11, N18892, Nov. 13, 2019, 65 pages.

Tabus et al., "Successive Refinement of Bounding Volumes for Point Cloud Coding", Nokia and Tampere University, ISO/IEC JTC1/SC29/WG11 MPEG2020/M54611, Jun. 2020, 8 pages.

International Search Report and Written Opinion received for corresponding Patent Cooperation Treaty Application No. PCT/FI2021/050183, dated Jun. 18, 2021, 16 pages.

* cited by examiner

METHOD, AN APPARATUS AND A COMPUTER PROGRAM PRODUCT FOR VIDEO ENCODING AND VIDEO DECODING

RELATED APPLICATION

This application claims priority to PCT Application No. PCT/FI2021/050183, filed on Mar. 15, 2021, which claims priority to Finnish Application No. 20205300, filed on Mar. 26, 2020, each of which is incorporated herein by reference in its entirety.

TECHNICAL FIELD

The present solution generally relates to a point cloud coding.

BACKGROUND

Since the beginning of photography and cinematography, the most common type of image and video content has been captured by cameras with relatively narrow field of view, and displayed as a rectangular scene on flat displays. The cameras are mainly directional, whereby they capture only a limited angular field of view (the field of view towards which they are directed).

More recently, new image and video capture devices are available. These devices are able to capture visual and audio content all around them, i.e. they can capture the whole angular field of view, sometimes referred to as 360 degrees field of view. More precisely, they can capture a spherical field of view (i.e., 360 degrees in all spatial directions). Furthermore, new types of output technologies have been invented and produced, such as head-mounted displays. These devices allow a person to see visual content all around him/her, giving a feeling of being "immersed" into the scene captured by the 360 degrees camera. The new capture and display paradigm, where the field of view is spherical, is commonly referred to as virtual reality (VR) and is believed to be the common way people will experience media content in the future.

For volumetric video, a scene may be captured using one or more 3D (three-dimensional) cameras. The cameras are in different positions and orientations within a scene. One issue to consider is that compared to 2D (two-dimensional) video content, volumetric 3D video content has much more data, so viewing it requires lots of bandwidth (with or without transferring it from a storage location to a viewing device): disk I/O, network traffic, memory bandwidth, GPU (Graphics Processing Unit) upload. Capturing volumetric content also produces a lot of data, particularly when there are multiple capture devices used in parallel.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

Various aspects include a method, an apparatus and a computer readable medium comprising a computer program stored therein, which are characterized by what is stated in the independent claims. Various embodiments are disclosed in the dependent claims.

According to a first aspect, there is provided a method, comprising:
receiving an input video frame comprising video data being represented by a point cloud;
generating one or more bounding volumes around the points of the point cloud;
encoding a first depth image of highest points of the bounded volume, and encode a second depth image of the lowest points of the bounded volume across a first axis;
determining a first section across a second axis from the first depth image and the second depth image to generate a feasible occupancy image and a list of pixels with unknown occupancy status;
encoding a binary sequence according to a true occupancy image, wherein the binary sequence transmits the occupancy status for the list of pixels with unknown occupancy status;
detecting anchoring points from the binary sequence, and encoding missing elements between the anchoring points by using anchored chain codes;
determining a first section across a third axis from the bounding volume reconstructed so far and create a list of pixels with unknown status;
encoding a binary sequence according to the true occupancy image wherein the binary sequence conveys the occupancy status of the list of pixels with unknown status; and
detecting the anchor points from the binary sequence and corresponding list of pixels and encode missing elements between the anchoring points by using anchored chain codes.

According to a second aspect, there is provided an apparatus comprising:
means for receiving an input video frame comprising video data being represented by a point cloud;
means for generating one or more bounding volumes around the points of the point cloud;
means for encoding a first depth image of highest points of the bounded volume, and encode a second depth image of the lowest points of the bounded volume across a first axis;
means for determining a first section across a second axis from the first depth image and the second depth image to generate a feasible occupancy image and a list of pixels with unknown occupancy status;
means for encoding a binary sequence according to a true occupancy image, wherein the binary sequence transmits the occupancy status for the list of pixels with unknown occupancy status;
means for detecting anchoring points from the binary sequence, and encoding missing elements between the anchoring points by using anchored chain codes;
means for determining a first section across a third axis from the bounding volume reconstructed so far and create a list of pixels with unknown status;
means for encoding a binary sequence according to the true occupancy image wherein the binary sequence conveys the occupancy status of the list of pixels with unknown status; and
means for detecting the anchor points from the binary sequence and corresponding list of pixels and encode missing elements between the anchoring points by using anchored chain codes.

According to a third aspect, there is provided an apparatus comprising at least one processor, memory including computer program code, the memory and the computer program code configured to, with the at least one processor, cause the apparatus to perform at least the following:

receive an input video frame comprising video data being represented by a point cloud;

generate one or more bounding volumes around the points of the point cloud;

encode a first depth image of highest points of the bounded volume, and encode a second depth image of the lowest points of the bounded volume across a first axis;

determine a first section across a second axis from the first depth image and the second depth image to generate a feasible occupancy image and a list of pixels with unknown occupancy status;

encode a binary sequence according to a true occupancy image, wherein the binary sequence transmits the occupancy status for the list of pixels with unknown occupancy status;

detect anchoring points from the binary sequence, and encoding missing elements between the anchoring points by using anchored chain codes;

determine a first section across a third axis from the bounding volume reconstructed so far and create a list of pixels with unknown status;

encode a binary sequence according to the true occupancy image wherein the binary sequence conveys the occupancy status of the list of pixels with unknown status; and detect the anchor points from the binary sequence and corresponding list of pixels and encode missing elements between the anchoring points by using anchored chain codes.

According to a fourth aspect, there is provided a computer program product code configured to, when executed on at least one processor, cause an apparatus or a system to:

receive an input video frame comprising video data being represented by a point cloud;

generate one or more bounding volumes around the points of the point cloud;

encode a first depth image of highest points of the bounded volume, and encode a second depth image of the lowest points of the bounded volume across a first axis;

determine a first section across a second axis from the first depth image and the second depth image to generate a feasible occupancy image and a list of pixels with unknown occupancy status;

encode a binary sequence according to a true occupancy image, wherein the binary sequence transmits the occupancy status for the list of pixels with unknown occupancy status;

detect anchoring points from the binary sequence, and encoding missing elements between the anchoring points by using anchored chain codes;

determine a first section across a third axis from the bounding volume reconstructed so far and create a list of pixels with unknown status;

encode a binary sequence according to the true occupancy image wherein the binary sequence conveys the occupancy status of the list of pixels with unknown status; and detect the anchor points from the binary sequence and corresponding list of pixels and encode missing elements between the anchoring points by using anchored chain codes.

According to an embodiment, it is determined that if two consecutive sections have different boundaries, and then inner points in one or both of the sections are constructed.

According to an embodiment, the depth images are encoded by encoding geodesic contours of a depth image;
constructing connected component regions having the same value out of the contours;
transmitting the depth value for each region.

According to an embodiment, the point cloud is translated into positive three-dimensional coordinates.

According to an embodiment, a first axis is selected for a depth and a second axis is selected for a perpendicular plane section.

According to an embodiment, a bounding volume is sectioned perpendicular to the second axis into point cloud sections; means for extracting a boundary for each point cloud section and for refining the boundary in two stages, wherein the first stage marks points of the boundary contour as ones, and points not being boundaries as zeros; generating the binary sequence from the ones and zeros, and encoding the binary sequence using a Markov model.

According to an embodiment, anchor points are determined from the binary sequence to be starts and ends of the zero sequences.

According to an embodiment, the computer program product is embodied on a non-transitory computer readable medium.

DESCRIPTION OF THE DRAWINGS

In the following, various embodiments will be described in more detail with reference to the appended drawings, in which.

DESCRIPTION OF EXAMPLE EMBODIMENTS

Volumetric video may be captured using one or more three-dimensional (3D) cameras. When multiple cameras are in use, the captured footage is synchronized so that the cameras provide different viewpoints to the same world. In contrast to traditional two-dimensional/tree-dimensional (2D/3D) video, volumetric video describes a 3D model of the world where the viewer is free to move and observe different parts of the world.

Volumetric video enables the viewer to move in six degrees of freedom (DOF): in contrast to common 360° video, where the user has from 2 to 3 degrees of freedom (yaw, pitch, and possibly roll), a volumetric video represents a 3D volume of shape rather than a flat image plane. Volumetric video frames contain a large amount of data because they model the contents of a 3D volume instead of just a 2D plane. However, only a relatively small part of the volume changes over time. Therefore, it may be possible to reduce the total amount of data by only coding information about an initial state and changes which may occur between frames. Volumetric video can be rendered from synthetic 3D animations, reconstructed from multi-view video using 3D reconstructing techniques such as structure from motion, or captured with a combination of cameras and depth sensors such as LiDAR, for example.

Volumetric video data represents a three-dimensional scene or object, and can be used as input for augmented reality (AR), virtual reality (VR) and mixed reality (MR) applications. Such data describes geometry (shape, size, position in 3D space) and respective attributes (e.g. color, opacity, reflectance, . . . ). In addition, the volumetric video data can define any possible temporal changes of the geometry and attributes at given time instances (such as frames in 2D video). Volumetric video can be generated from 3D models, i.e. computer-generated imaginary (CGI), or captured from real-world scenes using a variety of capture solutions, e.g. multi-camera, laser scan, combination of video and dedicated depth sensors, and more. Also, a combination of CGI and real-world data is possible. Examples of representation formats for such volumetric data comprises triangle meshes, point clouds, or voxel. Temporal information about the scene can be included in the form of individual capture instances, i.e. "frames" in 2D video, or other means, e.g. position of an object as a function of time.

Because volumetric video describes a 3D scene (or object), such data can be viewed from any viewpoint. Therefore, volumetric video is an important format for any AR, VR, or MR applications, especially for providing 6DOF viewing capabilities.

Increasing computational resources and advances in 3D data acquisition devices has enabled reconstruction of highly detailed volumetric video representations of natural scenes. Infrared, lasers, time-of-flight and structured light are examples of devices that can be used to construct 3D video data. Representation of the 3D data depends on how the 3D data is used. Dense Voxel arrays have been used to represent volumetric medical data. In 3D graphics, polygonal meshes are extensively used. Point clouds on the other hand are well suited for applications such as capturing real world 3D scenes where the topology is not necessarily a 2D manifold. Another way to represent 3D data is to code the 3D data as a set of texture and depth map as is the case in the multi-view plus depth. Closely related to the techniques used in multi-view plus depth is the use of elevation maps, and multi-level surface maps.

Point clouds are representations of volumetric data for describing three-dimensional (3D) objects or scenes. A point cloud comprises a set of data points in a 3D space, each of which is specified by its spatial (x, y, z) position. The points may be associated with other attributes as well, such as RGB color, surface normal and reflectance. A point cloud can be used to reconstruct an object or a scene as a composition of the points. Point clouds can be captured by using multiple cameras and depth sensors. A dynamic point cloud is a sequence of static point clouds, wherein each static point cloud is in its own "point cloud frame".

The compression of point clouds may be implemented in various ways. For example, dynamic point clouds may be compressed by traditional video codecs, whereas static and dynamically acquired point clouds can be efficiently compressed with octree-based geometry coding. Thus, the point cloud compression may follow two alternative tracks, i.e. Geometry-based point cloud compression (G-PCC) or Video-based point cloud compression (V-PCC).

The present embodiments are related to a geometry-based point cloud coding (G-PCC). ISO/IEC MPEG (JTC 1/SC 29/WG 11) is currently studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area. One part of this effort is the G-PCC standard (Geometry-based Point Cloud Compression).

G-PCC addresses the compression of highly complex and sparse point clouds, both for static and dynamic PC acquisition uses cases. G-PCC consists of decomposing 3D space into a hierarchical structure of cubes and encoding each point as an index of the cube it belongs to.

Figure 1:
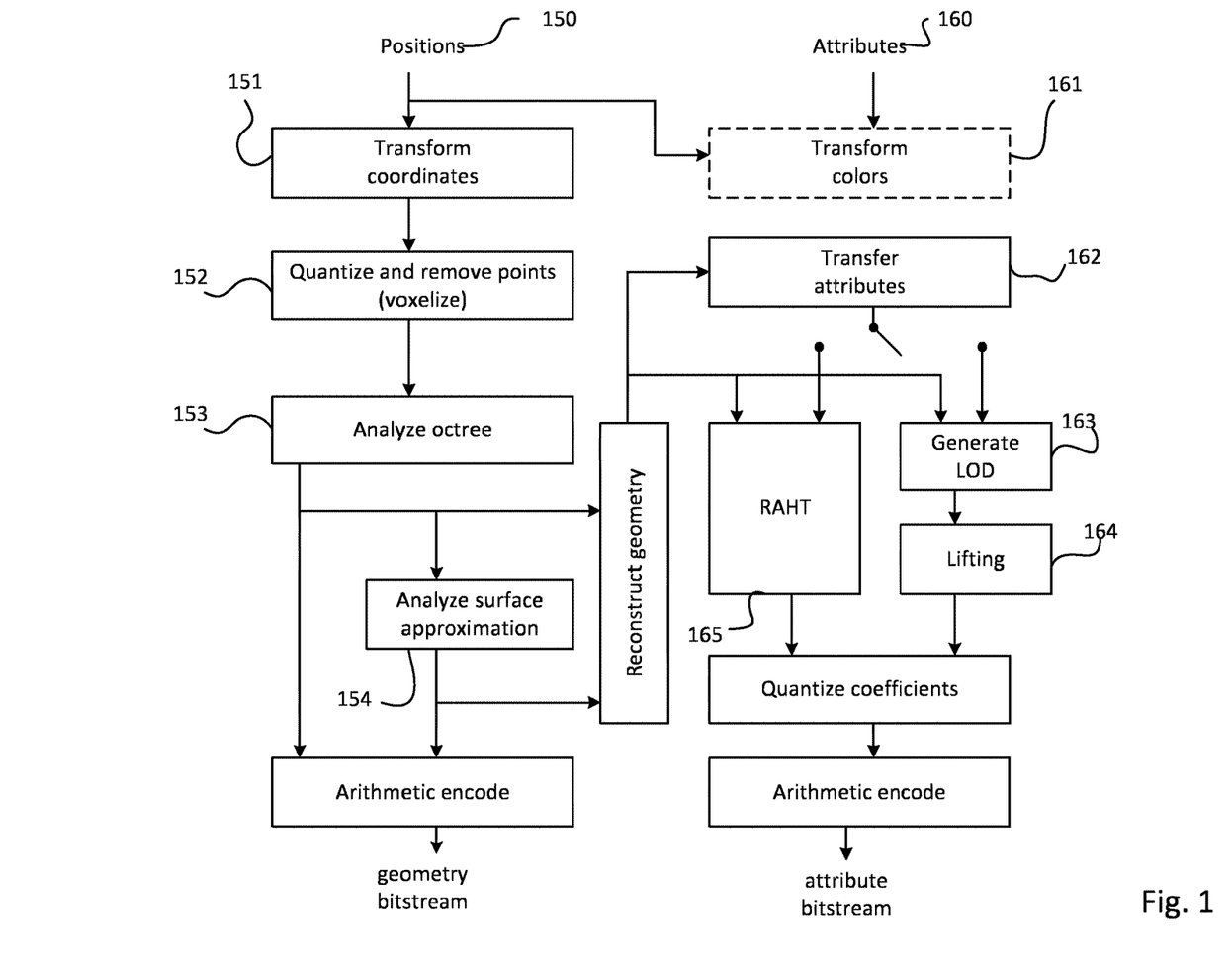
FIG. 1 shows an overview of a G-PCC encoder.
Figure 2:
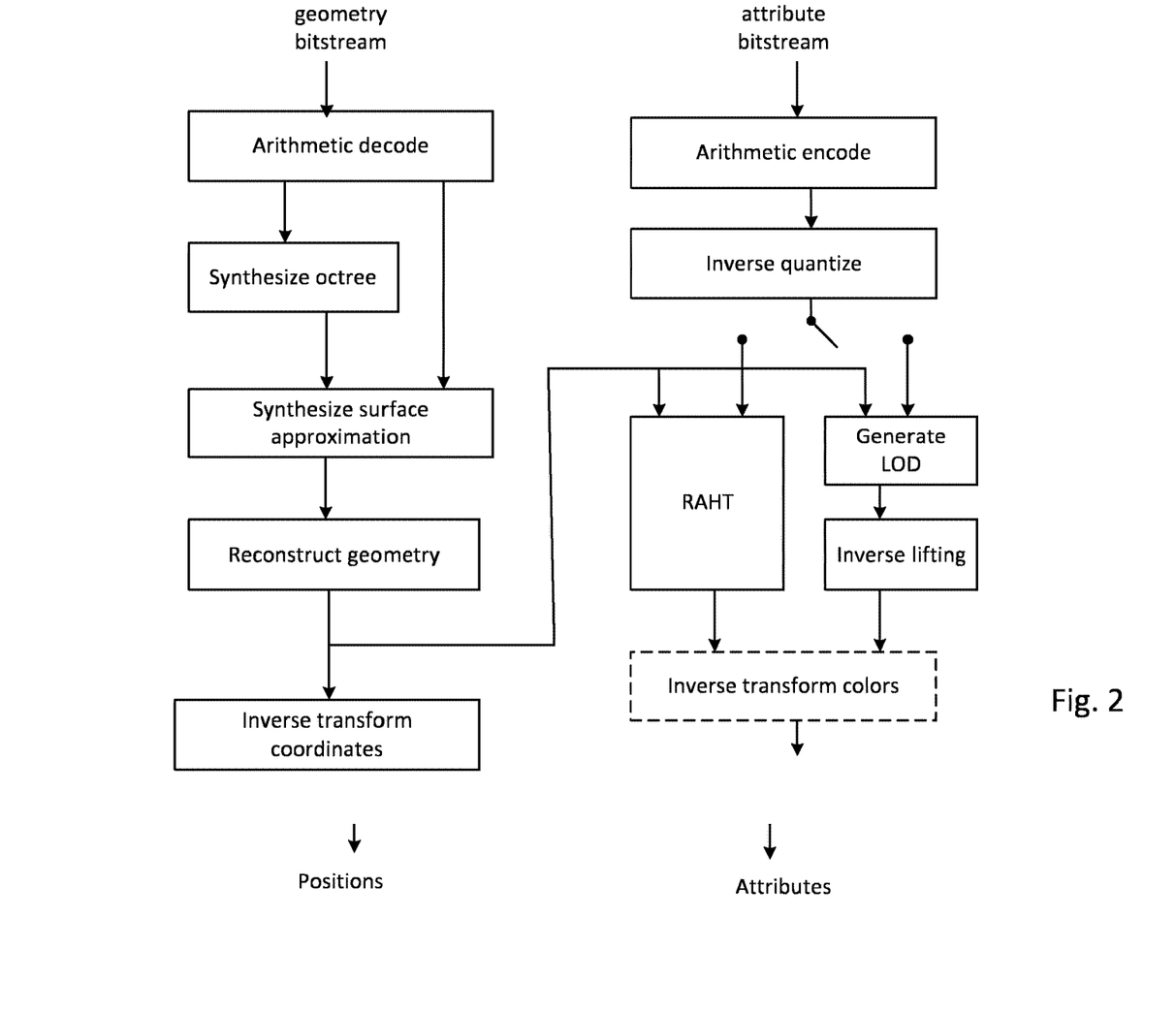
FIG. 2 shows an overview of a G-PCC decoder.

FIG. 1 illustrates an example of a G-PCC encoder and FIG. 2 illustrates an example of a G-PCC decoder.

A G-PCC encoder receives point cloud data as input. As mentioned, a point cloud is a collection of points with positions 150 and optional attributes 160. The geometry of the point cloud comprises the point positions only. The attributes of the point cloud comprise the point attributes only. Original application-specific point positions may be represented by floating point numbers and need not to have any structure. These point positions are transformed into frame coordinates at coordinate transformation 151. Attribute quantization of colour components is agnostic to the colour space of the components, however, the attributes can be converted from RGB to YCbCr and back again, if desired at transform colour 161.

Point positions are represented internally as non-negative integers before being compressed. To obtain these integers, the point positions are rounded for quantization at quantization and removal phase 152. After such quantization, there may be multiple points with the same positions, called duplicate points. These duplicate points can be removed, if desired. Multiple points with the same quantized position and different attributes will be merged in a single points. The attributes associated with single point will be computed by the attributes transfer module 162. The process of position quantization, duplicate point removal and assignment of attributes to the remaining points is called voxelization. Thus, voxelization is a process of grouping points together into voxels.

Modules "Analyze surface approximation" 154 and "Region Adaptive Hierarchical Transform (RAHT)" 165 are options that may especially be used for static point cloud (PC) data. Modules "Generate LOD" 163 and "Lifting" 164 are options that may especially be used for dynamically acquired point cloud data. All the other modules are common.

For dynamically acquired PC data, the compressed geometry may be represented as an octree from the root all the way down to a leaf level of individual voxels. For static PC data, the compressed geometry may be represented by a pruned octree (i.e., an octree from the root down to a leaf level of blocks larger than voxels) plus a model that approximates the surface within each leaf of the pruned octree. In this way, both data types share the octree coding mechanism, while the static data may in addition approximate the voxels within each leaf with a surface model. The surface model used is a triangulation comprising 1-10 triangles per block, resulting in a triangle soup. The static geometry codec is therefore known as the Trisoup geometry codec, while the dynamically acquired geometry codec is known as the Octree geometry codec.

Currently, the G-PCC comprises three attribute coding methods: Region Adaptive Hierarchical Transform (RAHT) coding 165, interpolation-based hierarchical nearest-neighbour prediction (Predicting Transform), and interpolation-based hierarchical nearest-neighbour prediction with an update/lifting step (Lifting Transform) 164. RAHT 165 and Lifting 164 may be used for static point clouds for representing static objects and scenes, while Predicting may be used for dynamically acquired point clouds for autonomous navigation purposes. However, either method may be used for any data, and, just like with the geometry codecs in G-PCC, the user has the option to choose which of the attribute codecs they would like to use.

It has been realized that lossy compression of static and dynamically acquired point clouds using G-PCC can be improved to enhance the coding performance. The present embodiments provide a solution of Successive Refinement of Bounding Volumes using Outer Surface Anchor Points for G-PCC data. Thus, the present solution enables lossy compression of geometry of point clouds.

The present embodiments enable reconstructing the geometry from only the two depth maps associated to a single projection direction. Hence, there is no need to organize an expanded pad or mosaic image. Instead, one may use well-defined anchor points, that are recovered as side information of the progressive reconstruction process.

The reconstruction from the two depth images follows several principles for analysing and encoding, several of which are only optional. The resulting bitstream may be embedded; the bitstream can be truncated at various level of reconstruction of the bounding volume.

The encoding tools for encoding the needed entities (e.g. the binary string representing the occupancy maps, the chain coded representing the anchor segments) are developed to be simple and elementary. The encoding tools may involve run-length coding or Markov models of order one with arithmetic coding, and chain coding which can be implemented in various ways.

The present embodiments can be combined with the G-PCC coding, for reconstructing the sparse point clouds in a lossless way. The reduction of complex clouds to objects that have been encoded with the current proposal is relatively fast and simple.

The geometry encoding, according to an embodiment, is carried out through a sequential process, where tight bounding volumes around the points of the point cloud are iteratively constructed and refined. The point cloud is translated so that 3D coordinates x, y, z are positive, and bounded by bounding volume (e.g. a bounding box) extremes N, M, L, respectively. A first axis Oz is selected to define the depth, and a second axis Oy is selected to draw perpendicular plane sections. The starting point for the present embodiments is the encoding of two two-dimensional depth images: one for max z(x, y) and one for min z(x, y), for all (x, y) in the N*M rectangular grid.

A reconstruction bounding volume (RBV) is initialized to include all points (x, y, z) having z between max(z(x, y)) and min(z(x, y)). The reconstruction bounding volume may then be sectioned perpendicular to the second axis, at the planes $y=y_0$, and for each resulting point cloud section, the boundary is extracted and refined in two stages, so that it becomes identical to the true boundary of the section $y=y_0$. The first refining stage marks the points of the reconstructed boundary contour (RBC) that are true points as ones "1", and the points that are not true boundaries as zeros "0", and the resulting binary string (BS) is encoded using a Markov model. The starts and ends of the zero sequences in the BS form the potential anchor points, between which the true boundary is different from the RBC. These true segments are encoded as chain codes, resulting finally in the true border of the entire section $y=y_0$. Next are considered the connections between the two successive sections along the plane $y=y_0$ and the plane $y=y_0+1$ (for which only the true boundaries are known, but not yet the possible interior points). By examining the necessary connectivity relations, one obtains sets of candidate interior points within each of the two boundaries. At this stage, the outer shape of a reconstruction bounding volume is fully defined.

As an alternative embodiment, the missing points between the sections at plane $y=y_0$ and the plane $y=y_0+1$ can be obtained by utilizing the similar reconstruction operations as were described for a single plane, but now considering a third axis. Thus, it is considered at plane $x=x_0$ the intersection of the bounding volume reconstructed so far, and the feasible region is created, as well as the boundary of it and the construction of the binary sequence that convey the status of occupancy of the not yet known pixels. Then, one can extract anchor points, and transmit the true points that were unknown by chain codes, creating in the plane $x=x_0$ a complete description of the outer border. Since already after the loop over all planes $y=y_0$ the bounding volumes are mostly complete, the iteration over the planes $x=x_0$ can be omitted, or can be enforced only when it reconstructs important segments, or can be executed after the stage of considering the connections between the two successive sections along the plane $y=y_0$ and the plane $y=y_0+1$. One can perform additional iterations for clarifying if among the marked candidate interior points within each section, there are points that do not belong to the point cloud, hence transmitting refinements for the interior points, until all points within the true bounding volume are correctly transmitted. The successive marking of the true points along candidate boundary contours or across boundary surfaces at various stages give rise to exclusion information, which is stored so that no point is tested twice if it belongs to the point cloud or not.

The transmission of the markings along a sequence, or of the chain codes for a sequence between two anchor points, or of the interior points, have each some associated code length per occupied voxel transmitted. The transmission of the refinements of the RBM is organized in the increasing order of the bits per voxels of the elements, resulting in an embedded bitstream that can be truncated at various points, for obtaining an optimized RD overall performance. It is noted that a point cloud can be pre-processed so that it is partitioned in several bounding volumes, where the sections at y=y0 are decomposed in several 2D connected components, resulting in simple processing along boundaries of connected components, and also facilitating random access to the different parts of the point cloud. For sparse point clouds, the proposed method can be applied at lower than full resolution levels, while for a full lossless reconstruction, one may call several stages of further octree decomposition and encoding. However, good lossy performance can be obtained already using the proposed scheme alone.

The Successive Refinement of Bounding Volumes using Outer Surface Anchor Points according to present embodiments is discussed in more detailed manner in the following. At first, few definitions are made:

A point cloud defined by a ($n_{PC}{\times}3$) matrix B is considered, with the $i^{th}$ row a vector containing the $i^{th}$ pixel coordinates $B_i{=}[x_i\ y_i\ z_i]$ for all i=1, ..., $n_{PC}$;

Voxelized point clouds with $2^n$ pixels per coordinate are considered, where $B_{ij}{\in}\{0, ..., 2^n{-}1\}$.

The point cloud can also be referred to as a set B={$(x_i, y_i, z_i)$| i=1, ..., $n_{PC}$}.

Six possible permutations of the three components are considered, so that the point cloud is viewed from any of the six different directions.

z is associated to "depth" coordinate, y is associated to the direction for sectioning the point cloud with a plane $y{=}y_0$, and (z, x) is associated to the order of coordinates in the image representing a section (where z is the height or row and x is the column index).

The present embodiments are discussed in the following for a water-tight outer shell. The embodiments can be aggregated in many possible ways for a union of many such shells, possibly connected with "filaments" or "sheets".

The algorithm according to the present embodiments comprises the following steps:

1) encoding two depth images describing the upper cover and lower cover of the bounded volume across the vertical Oz axis;
2) constructing the feasible region on the section at the plane $y{=}y_0$;
3) encoding by primitive one: encode a binary mask for recovering vertical stretches of existent pixels on the section at the plane $y{=}y_0$;
4) encoding by primitive two: encode the missing elements of the true boundary using anchored chain codes;
5) encoding by primitive three: infer possible inner points in two consecutive sections;
6) optionally also applying the primitives one and two subsequently to each plane $x{=}x_0$ for a more complete reconstruction of the bounding volume than with primitive three, or combining with primitive three, wherein each could be used for reconstructing the points where they produce best results (note, that the reconstructions are by default lossy).

These steps are discussed in more detailed manner in the following.

1) Encode Two Depth Images Describing the Upper Cover and Lower Cover of the Bounded Volume Across the Vertical Oz Axis The first stage comprises encoding the depth image representing the highest points seen above the Oxy plane and then encoding the depth image of the lowest points above the Oxy plane. The empty part of each depth image is the same, so one can improve the performance by utilizing this information when encoding the two images (not yet implemented). The two depth images can be defined as follows:

construct the outer maximum depth image $A_{max}$;
associate to each point (x, y)${\in}\{0, ..., 2^n{-}1\}^2$ of the square grid either a non-existence marker $Z_{max}(x, y){=}{-}1$, if $\forall(x_i, y_i, z_i){\in}B, (x, y){\neq}(x_i\ y_i)\}$, or an existent depth, in case that (x, y) appears in any triplet $(x_i, y_i, z_i)$, in which case is denoted $Z_{max}(x, y){=}\max\{z_i|[x, y, z_i]{\in}B\}$.
construct the outer minimum half-shell similarly, as $Z_{min}(x, y){=}\min\{z_i|[x, y, z_i]{\in}B\}$, or by marked as z=−1 for the pairs (x, y) that are not appearing in any true point $(x_i, y_i, z_i)$.

Encoding the depth images can for example use the algorithm (crackedge, region, value) (CERV), which efficiently encodes first the geodesic contours of the depth image, then constructs out of the contours the connected component regions having the same depth value, and transmit the depth value for each region. The benefits of encoding the geodesic contours first and then transmitting the values in the constant regions is related to the similarities of the contour shapes and makes the algorithm to collect specific statistics when encoding the geodesic shapes, and hence capture the regularities in the depth image.

2) Construct the Feasible Region on the Section at the Plane $y{=}y_0$

Figure 3A:
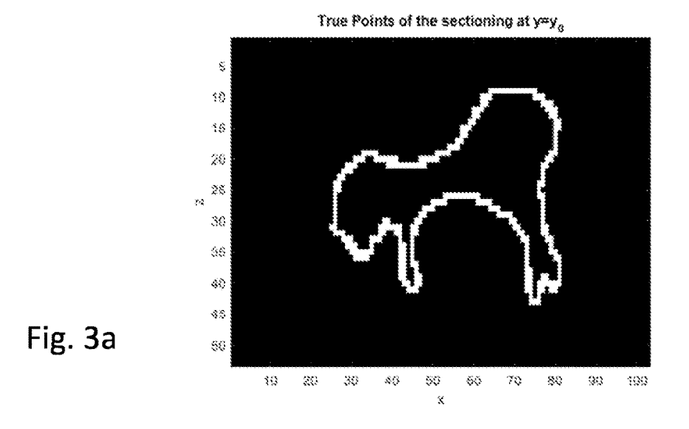
FIG. 3a-c show an example of constructing a feasible region according to embodiments.
Figure 3B:
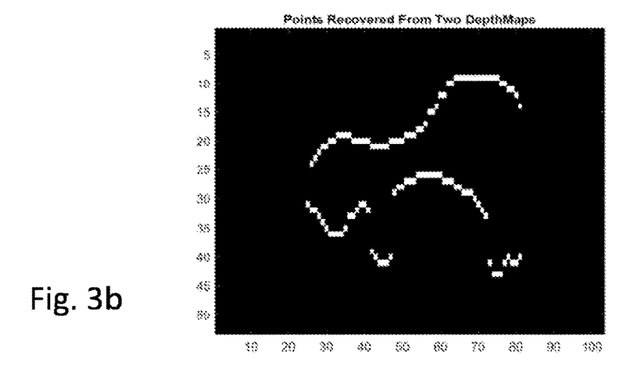

The second chosen axis Oy is considered, and perpendicular sections are constructed at every $y_0$. The true occupancy image $S_{y0}$ has the pixel coordinates (z, x) with $S_{y0}(z, x){=}1$ if (x, $y_0$, z)${\in}$B. FIG. 3a illustrates a true occupancy image at $y_0$. This true occupancy image is desired to be reconstructed out of the already transmitted information, and to use additionally transmitted entities as follows:

From the currently transmitted depth images, mark in a first section reconstruction $S^{[0]}_{y0}$ already some known boundary points:
select all existent points, at which $Z_{min}(x, y_0){>}{-}1$, and mark $S^{[0]}_{y0}(Z_{min}(x, y_0), x){=}1$.
Similarly, the information in $Z_{max}$ can be transferred to the section reconstruction, as $Z_{max}(x, y0){>}{-}1$, and mark $S^{[0]}_{y0}(Z_{max}(x, y_0), x){=}1$.

Figure 3C:
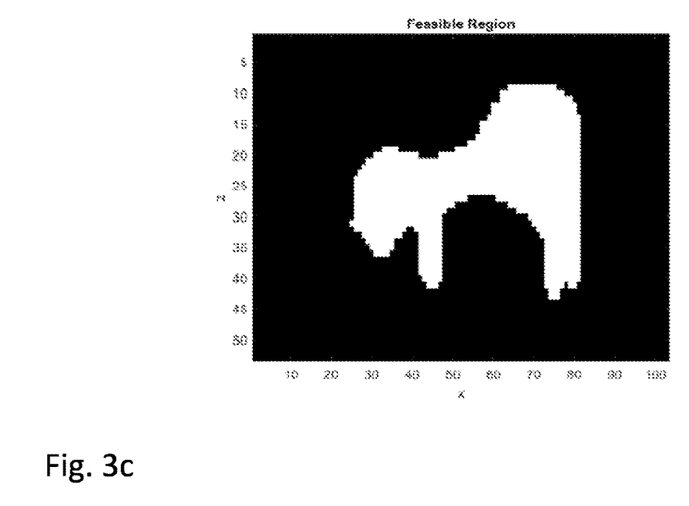

FIG. 3b illustrates the occupied pixels in $S^{[0]}_{y0}$, known after decoding the two depth images, for a given value of $y_0$. At section y=$y_0$, for a given $x_0$ it is already known that any occupied pixel (z, $x_0$) needs to have the coordinate z as $Z_{min}(x0, y0){\le}z{\le}Z_{max}(x0, y0)$. Hence, the area containing pixels (z, $x_0$) is defined as feasible region of occupancy, with $z_{min}(x_0, y_0){\le}z{\le}z_{max}(x_0, y_0)$. The binary feasible image is denoted $S^{[1]}_{y0}$. FIG. 3c illustrates the feasible occupancy image at $y_0$ by uniting the vertical maximum and minimum point on each vertical at the image.

Figure 4A:
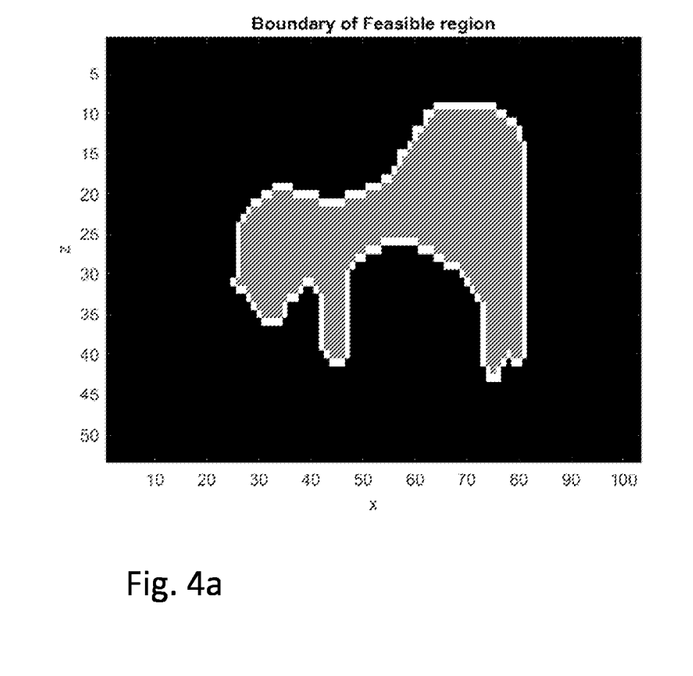
FIG. 4a-b show examples of an occupancy image showing borders for feasible region.
Figure 4B:
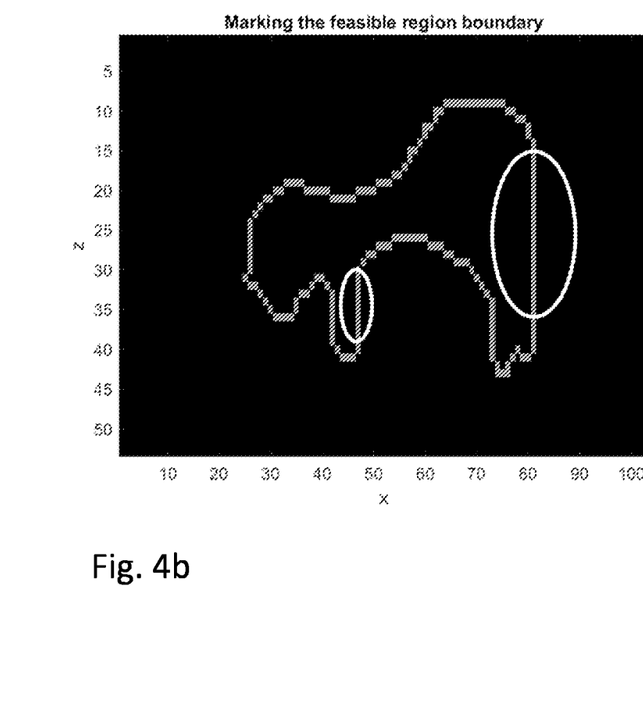

3) Encode by Primitive One: Encode a Binary Mask for Recovering Vertical Stretches of Existent Pixels on the Section at the Plane $y{=}y_0$:

FIG. 4a illustrates in white the boundary of the feasible occupancy image at $y_0$. The boundary is stored as a list of pixels, when traversing in clockwise sense the boundary. Each element of the list is marked by the occupancy status of that pixel. FIG. 4b illustrates by grey a pixel marked as one and the pixels of the grey line within a circle are marked by zero. The list of the markings is a binary sequence that can be efficiently coded by run-length coding or Markov model of order 1 and arithmetic coding. After this stage, the decoder knows all pixels of the grey boundary outside the circle in FIG. 4a.

Figure 5A:
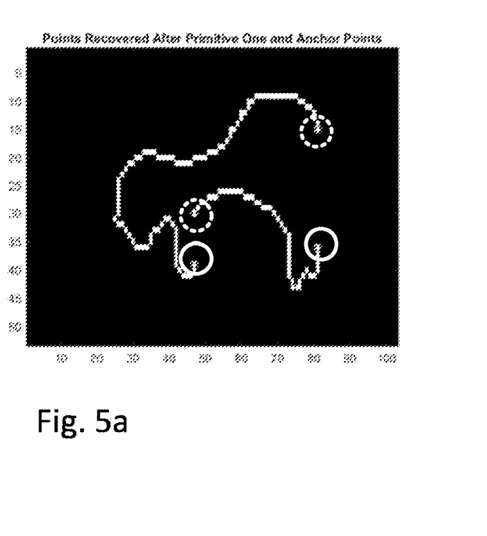
FIG. 5a-c show an example of encoding missing elements of a true boundary.

4) Encode by Primitive Two: Encode the Missing Elements of the True Boundary Using Anchored Chain Codes:

As an outcome from the previous stage, one can extract the anchor points, between which the boundary needs to be reconstructed. All the possible anchor points are the ends of the segments that have a circle around them (circle is only drawn for illustration), as shown in FIG. 5a. The solid circle is for the landing pixels, and the circle with dashed line is for starting pixels. At the encoder, these segments of true boundaries are encoded as chain codes and transmitted to the decoder. The length of each segment does not need to be transmitted, since it is checked during decoding of the chain whether the landing pixel has been reached where the chain coding decoding will be stopped. The anchor points, having the coordinates (x, $y_0$, z) can be visualized as points on the outer surface of the bounding volume, and each chain code segment reconstructs an inner segment of arbitrary complexity. The points are not projected to a plane, but they are kept organized as anchored segments, at known locations of the outer surface.

Figure 5B:
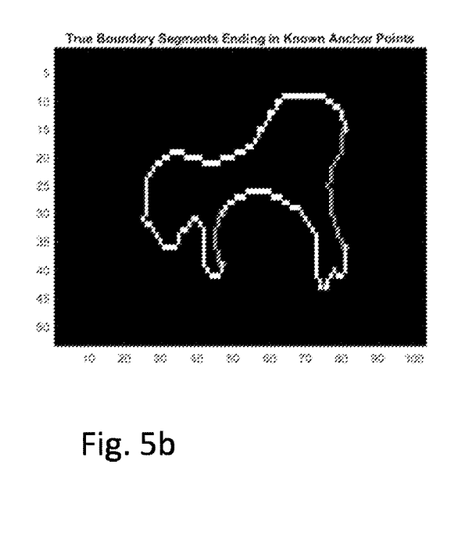
Figure 5C:
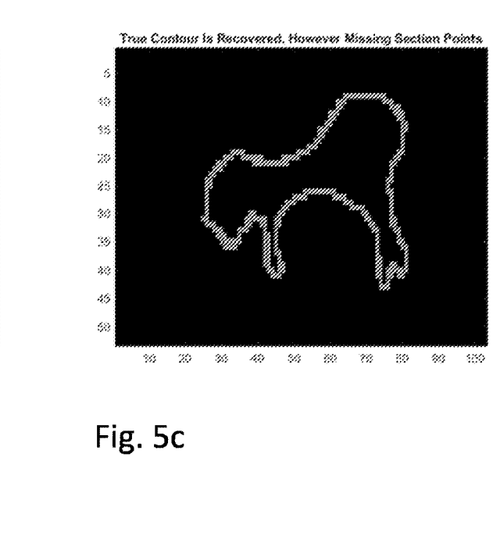

FIG. 5b illustrates an example of encoding the missing true boundary segments, shown in grey, between the anchor points, as chain codes. FIG. 5c illustrates the end of stage 2 with the full true boundary recovered and with the additional missing inner true points.

Figure 6A:
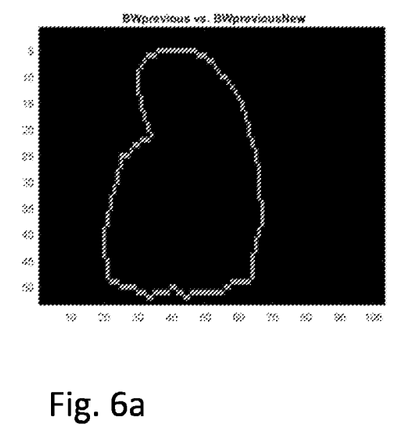
FIG. 6a-c show examples of inferring possible inner points in two consecutive sections.
Figure 6B:
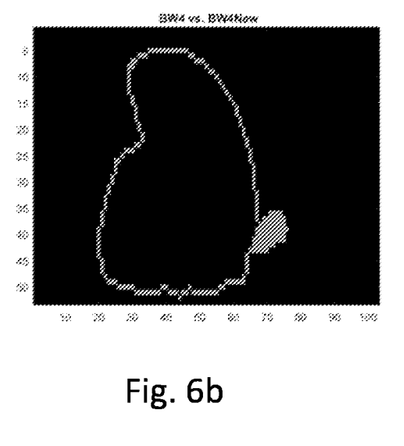
Figure 6C:
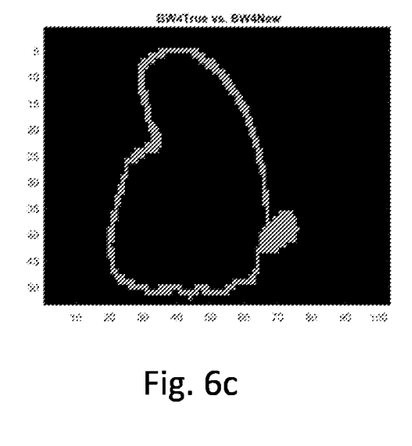

5) Encode by Primitive Three: Infer Possible Inner Points in Two Consecutive Sections:

Two consecutive sections, at $y=y_0$ and $y=y_0+1$ may have different boundary of the true region. In order for the bounding volume to hold water, inner points in one or both of the sections need to be constructed. FIGS. 6a-6c illustrate an example having two consecutive sections at y=143 and y=144. FIG. 6a shows a true contour at y=143 encoded after primitive two. This true contour is tested for possible inclusion of new inner points by comparing it with the true contour of section y=144. FIG. 6b illustrates a contour of section y=144, which is larger than the contour at y=143, and hence the additional points in grey were added, to keep a bounded volume without holes. No extra bitrate is consumed for adding the points. However, if the added points are not correct, a flag will indicate to the decoder to not perform primitive three for the current section. FIG. 6c illustrates a comparison of the added points to the true interior points at y=144, whereupon it is found out that the added points are true points. Hence, a flag will indicate the decoder to add the points. Some interior points are missing, but they can be added in the next phase, if the available bitrate allows transmitting additional information.

Figure 7:
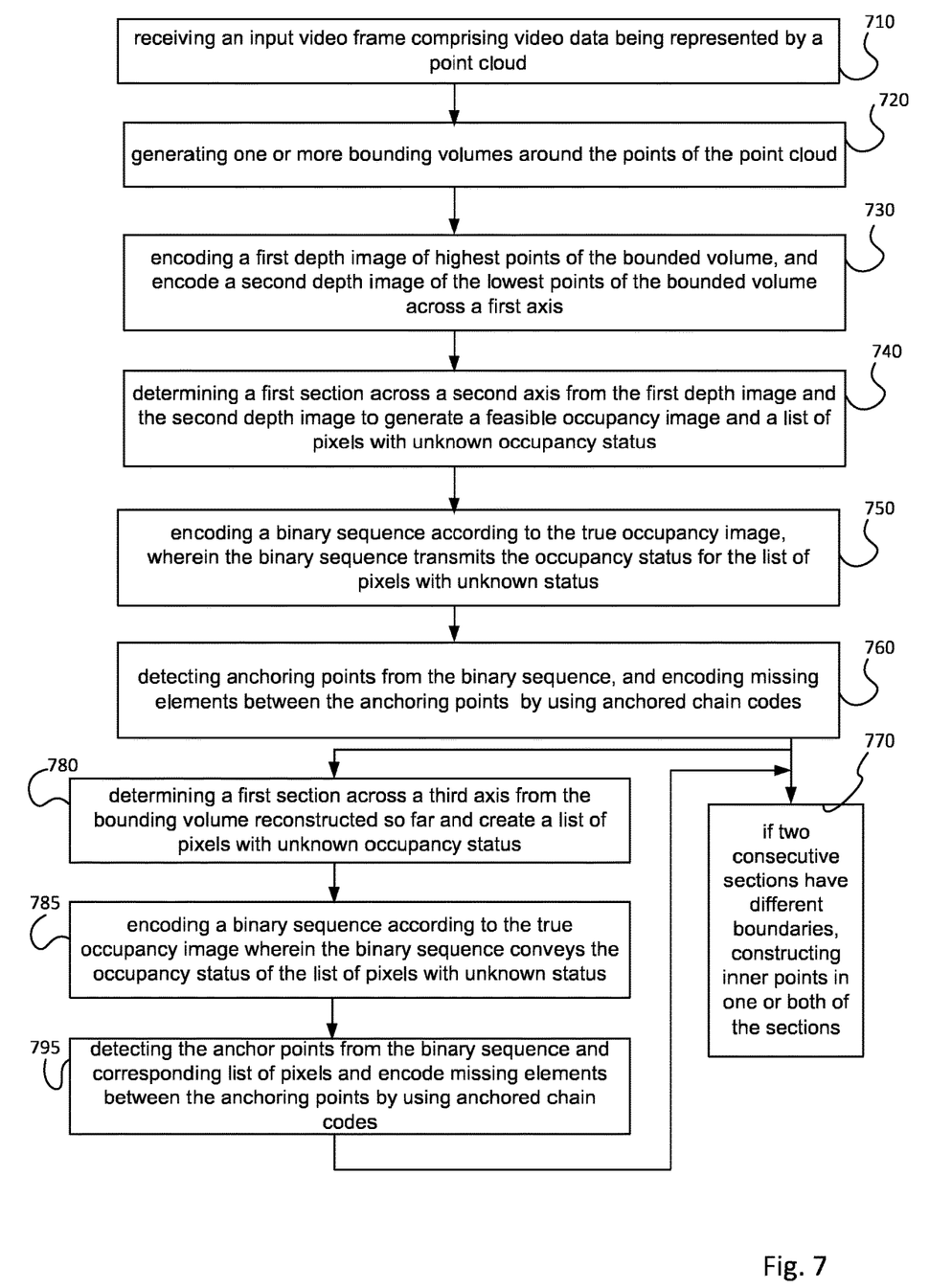
FIG. 7 is a flowchart illustrating a method according to an embodiment.

The method according to an embodiment is shown in FIG. 7. The method generally comprises receiving 710 an input video frame comprising video data being represented by a point cloud;

generating 720 one or more bounding volumes around the points of the point cloud;

encoding 730 a first depth image of highest points of the bounded volume, and encode a second depth image of the lowest points of the bounded volume across a first axis;

determining 740 a first section across a second axis from the first depth image and the second depth image to generate a feasible occupancy image and a list of pixels with unknown occupancy status;

encoding 750 a binary sequence according to a true occupancy image, wherein the binary sequence transmits the occupancy status for the list of pixels with unknown occupancy status;

detecting 760 anchoring points from the binary sequence, and encoding missing elements between the anchoring points by using anchored chain codes;

if two consecutive sections have different boundaries, constructing 770 inner points in one or both of the sections;

determining 780 a first section across a third axis from the bounding volume reconstructed so far and create a list of pixels with unknown status;

encoding 785 a binary sequence according to the true occupancy image wherein the binary sequence conveys the occupancy status of the list of pixels with unknown status;

detecting 790 the anchor points from the binary sequence and corresponding list of pixels and encode missing elements between the anchoring points by using anchored chain codes.

Each of the steps can be implemented by a respective module of a computer system. In the embodiment, shown in FIG. 7, the steps 780, 785, 790 are illustrated as occurring between steps 760 and 770. According to another embodiment, the steps 780, 785, 790 can be executed after step 770. According to yet another embodiment, the steps 780, 785, 790 can be executed as an alternative to step 770.

An apparatus according to an embodiment comprises means for receiving an input video frame comprising video data being represented by a point cloud; means for generating one or more bounding volumes around the points of the point cloud; means for encoding a first depth image of highest points of the bounded volume, and means for encoding a second depth image of the lowest points of the bounded volume across a first axis; means for determining a first section across a second axis from the first depth image and the second depth image to generate a feasible occupancy image and a list of pixels with unknown occupancy status; means for encoding a binary sequence according to a true occupancy image, wherein the binary sequence transmits the occupancy status for the list of pixels with unknown occupancy status; means for detecting anchoring points from the binary sequence, and means for encoding missing elements between the anchoring points by using anchored chain codes; if two consecutive sections have different boundaries, means for constructing inner points in one or both of the sections; means for determining a first section across a third axis from the bounding volume reconstructed so far and create a list of pixels with unknown status; means for encoding a binary sequence according to the true occupancy image wherein the binary sequence conveys the occupancy status of the list of pixels with unknown status; means for detecting the anchor points from the binary sequence and corresponding list of pixels and means for encoding missing elements between the anchoring points by using anchored chain codes. The means comprises at least one processor, and a memory including a computer program code, wherein the processor may further comprise processor circuitry. The memory and the computer program code are configured to, with the at least one processor, cause the apparatus to perform the method according to various embodiments.

Figure 8:
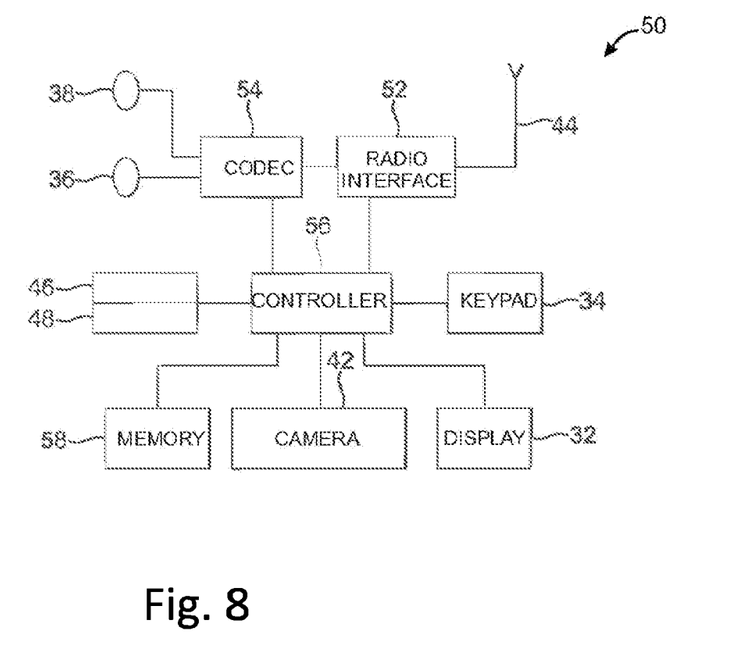
FIG. 8 shows an apparatus according to an embodiment.

An example of an apparatus is disclosed with reference to FIG. 8. FIG. 8 shows a block diagram of a video coding system according to an example embodiment as a schematic block diagram of an electronic device 50, which may incorporate a codec. In some embodiments the electronic device may comprise an encoder or a decoder. The electronic device 50 may for example be a mobile terminal or a user equipment of a wireless communication system or a camera device. The electronic device 50 may be also comprised at a local or a remote server or a graphics processing unit of a computer. The device may be also comprised as part of a head-mounted display device. The apparatus 50 may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example, the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera 42 capable of recording or capturing images and/or video. The camera 42 may be a multi-lens camera system having at least two camera sensors. The camera is capable of recording or detecting individual frames which are then passed to the codec 54 or the controller for processing. The apparatus may receive the video and/or image data for processing from another device prior to transmission and/or storage.

The apparatus 50 may comprise a controller 56 or processor for controlling the apparatus 50. The apparatus or the controller 56 may comprise one or more processors or processor circuitry and be connected to memory 58 which may store data in the form of image, video and/or audio data, and/or may also store instructions for implementation on the controller 56 or to be executed by the processors or the processor circuitry. The controller 56 may further be connected to codec circuitry 54 suitable for carrying out coding and decoding of image, video and/or audio data or assisting in coding and decoding carried out by the controller.

The apparatus 50 may further comprise a card reader 48 and a smart card 46, for example a UICC (Universal Integrated Circuit Card) and UICC reader for providing user information and being suitable for providing authentication information for authentication and authorization of the user at a network. The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es). The apparatus may comprise one or more wired interfaces configured to transmit and/or receive data over a wired connection, for example an electrical cable or an optical fiber connection.

The various embodiments may provide advantages. For example, the present embodiments may improve the coding efficiency over G-PCC. In addition, the present embodiments provide simplified encoding and decoding. The present embodiments provide a possibility to combine with existing G-PCC attribute compression solutions. In addition, the present embodiments provide a possibility to combine with existing G-PCC solutions to achieve lossless compression.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment. The computer program code comprises one or more operational characteristics. Said operational characteristics are being defined through configuration by said computer based on the type of said processor, wherein a system is connectable to said processor by a bus, wherein a programmable operational characteristic of the system comprises receiving an input video frame comprising video data being represented by a point cloud; generating one or more bounding volumes around the points of the point cloud; encoding a first depth image of highest points of the bounded volume, and encoding a second depth image of the lowest points of the bounded volume across a first axis; determining a first section across a second axis from the first depth image and the second depth image to generate a feasible occupancy image and a list of pixels with unknown occupancy status; encoding a binary sequence according to a true occupancy image, wherein the binary sequence transmits the occupancy status for the list of pixels with unknown occupancy status; detecting anchoring points from the binary sequence, and encoding missing elements between the anchoring points by using anchored chain codes; if two consecutive sections have different boundaries, constructing inner points in one or both of the sections; determining a first section across a third axis from the bounding volume reconstructed so far and create a list of pixels with unknown status; encoding a binary sequence according to the true occupancy image wherein the binary sequence conveys the occupancy status of the list of pixels with unknown status; detecting the anchor points from the binary sequence and corresponding list of pixels and encoding missing elements between the anchoring points by using anchored chain codes.

A computer program product according to an embodiment can be embodied on a non-transitory computer readable medium. According to another embodiment, the computer program product can be downloaded over a network in a data packet.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method, comprising:
   receiving an input video frame comprising video data being represented by a point cloud;
   generating one or more bounding volumes around one or more points of the point cloud;
   encoding a first depth image of highest points of the bounded volume, and encoding a second depth image of the lowest points of the bounded volume across a first axis;
   determining a first section across a second axis from the first depth image and the second depth image to generate a feasible occupancy image and a list of pixels with unknown occupancy status;
   encoding a binary sequence according to a true occupancy image, wherein the binary sequence transmits the occupancy status for the list of pixels with unknown occupancy status;
   detecting anchoring points from the binary sequence, and encoding missing elements between the anchoring points by using anchored chain codes;

determining a first section across a third axis from the bounding volume reconstructed so far and create a list of pixels with unknown status;

encoding a binary sequence according to the true occupancy image, wherein the binary sequence conveys the occupancy status of the list of pixels with unknown status;

detecting the anchor points from the binary sequence and corresponding list of pixels;

and encoding missing elements between the anchoring points by using anchored chain codes.

2. The method according to claim 1 further comprising constructing inner points in one or both of the sections, when two consecutive sections have different boundaries.

3. The method according to claim 1 wherein encoding the first or the second depth images comprises:

encoding geodesic contours of the first or the second depth image;

constructing connected component regions out of the contours, wherein each region comprises same depth value; and transmitting the depth value for the each region.

4. The method according to claim 1 further comprising translating the point cloud into positive three-dimensional coordinates.

5. The method according to claim 1 further comprising selecting the first axis for a depth and the second axis for a perpendicular plane section.

6. The method according to claim 5 further comprising:

sectioning a bounding volume perpendicular to the second axis into point cloud sections;

extracting a boundary for each point cloud section and for refining the boundary in two stages, wherein a first stage marks points of the boundary contour as ones, and points not being boundaries as zeros;

generating the binary sequence from the ones and zeros; and encoding the binary sequence using a Markov model.

7. The method according to claim 6, further comprising determining anchor points from the binary sequence to be starts and ends of the zero sequences.

8. An apparatus comprising at least one processor, memory including computer program code, the memory and the computer program code configured to, with the at least one processor, cause the apparatus to perform at least the following:

receive an input video frame comprising video data being represented by a point cloud;

generate one or more bounding volumes around one or more points of the point cloud;

encode a first depth image of highest points of the bounded volume, and encode a second depth image of the lowest points of the bounded volume across a first axis;

determine a first section across a second axis from the first depth image and the second depth image to generate a feasible occupancy image and a list of pixels with unknown occupancy status;

encode a binary sequence according to a true occupancy image, wherein the binary sequence transmits the occupancy status for the list of pixels with unknown occupancy status;

detect anchoring points from the binary sequence, and encoding missing elements between the anchoring points by using anchored chain codes;

determine a first section across a third axis from the bounding volume reconstructed so far and create a list of pixels with unknown status;

encode a binary sequence according to the true occupancy image wherein the binary sequence conveys the occupancy status of the list of pixels with unknown status;

detect the anchor points from the binary sequence and corresponding list of pixels; and encode missing elements between the anchoring points by using anchored chain codes.

9. The apparatus according to claim 8, wherein the apparatus is further caused to: construct inner points in one or both of the sections, when two consecutive sections have different boundaries.

10. The apparatus according to claim 8, wherein the apparatus is further caused to: encode the first or the second depth images by encoding geodesic contours of the first or the second depth image;

constructing connected component regions out of the contours, wherein each region comprises same depth value; and transmitting the depth value for the each region.

11. The apparatus according to claim 8, wherein the apparatus is further caused to: translate the point cloud into positive three-dimensional coordinates.

12. The apparatus according to claim 8, wherein the apparatus is further caused to: select the first axis for a depth and the second axis for a perpendicular plane section.

13. The apparatus according to claim 12, wherein the apparatus is further caused to: section a bounding volume perpendicular to the second axis into point cloud sections; extract a boundary for each point cloud section and refine the boundary in two stages, wherein a first stage marks points of the boundary contour as ones, and points not being boundaries as zeros; generate the binary sequence from the ones and zeros; and encode the binary sequence using a Markov model.

14. The apparatus according to claim 13, wherein the apparatus is further caused to:

determine anchor points from the binary sequence to be starts and ends of the zero sequences.

* * * * *